(12) United States Patent
Yoshida et al.

(10) Patent No.: US 11,706,396 B2
(45) Date of Patent: Jul. 18, 2023

(54) IMAGE PROCESSING APPARATUS THAT PERFORMS PROCESSING CONCERNING DISPLAY OF STEREOSCOPIC IMAGE, IMAGE PROCESSING METHOD, AND STORAGE MEDIUM

(71) Applicant: CANON KABUSHIKI KAISHA, Tokyo (JP)

(72) Inventors: Takehiro Yoshida, Tokyo (JP); Takumi Uehara, Kanagawa (JP); Hiroki Ito, Kanagawa (JP); Kunihiro Shirai, Kanagawa (JP); Takuma Mikawa, Kanagawa (JP); Hiroshi Atobe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/467,339

(22) Filed: Sep. 6, 2021

(65) Prior Publication Data

US 2022/0078394 A1 Mar. 10, 2022

(30) Foreign Application Priority Data

Sep. 10, 2020 (JP) .................. 2020-152202

(51) Int. Cl.
*H04N 13/139* (2018.01)
*G06F 8/65* (2018.01)
*H04N 13/178* (2018.01)
*H04N 13/344* (2018.01)

(52) U.S. Cl.
CPC ............ *H04N 13/139* (2018.05); *G06F 8/65* (2013.01); *H04N 13/178* (2018.05); *H04N 13/344* (2018.05)

(58) Field of Classification Search
CPC .. H04N 13/139; H04N 13/178; H04N 13/344; G06F 8/65
USPC ............................................ 348/43
See application file for complete search history.

(56) References Cited

U.S. PATENT DOCUMENTS

| 9,100,638 B2 * | 8/2015 | Broberg ............... H04N 13/194 |
| 10,506,211 B2 * | 12/2019 | Sou ..................... G02B 27/0172 |
| 11,011,142 B2 * | 5/2021 | Sakaguchi ............... G09G 5/14 |
| 11,244,186 B2 * | 2/2022 | Horiike ................ G06V 10/945 |
| 2022/0385882 A1 * | 12/2022 | Aiba .................... H04N 13/178 |

FOREIGN PATENT DOCUMENTS

| JP | 2004-120527 A | 4/2004 |
| JP | 2019-029721 A | 2/2019 |

* cited by examiner

*Primary Examiner* — Helen Shibru
(74) *Attorney, Agent, or Firm* — Cowan, Liebowitz & Latman, P.C.

(57) ABSTRACT

An image processing apparatus that performs processing concerning the display of a stereoscopic image so as to improve the convenience of a user in viewing a stereoscopic image. A head mount display displays a stereoscopic image using image data including a plurality of images having different viewpoints. The image data is processed based on metadata attached to the image data. In a case where information indicating that the image data is associated with a file format which cannot cause the head mount display to perform display is included in the metadata, the image data is converted into a file format which can cause the head mount display to perform display.

8 Claims, 12 Drawing Sheets

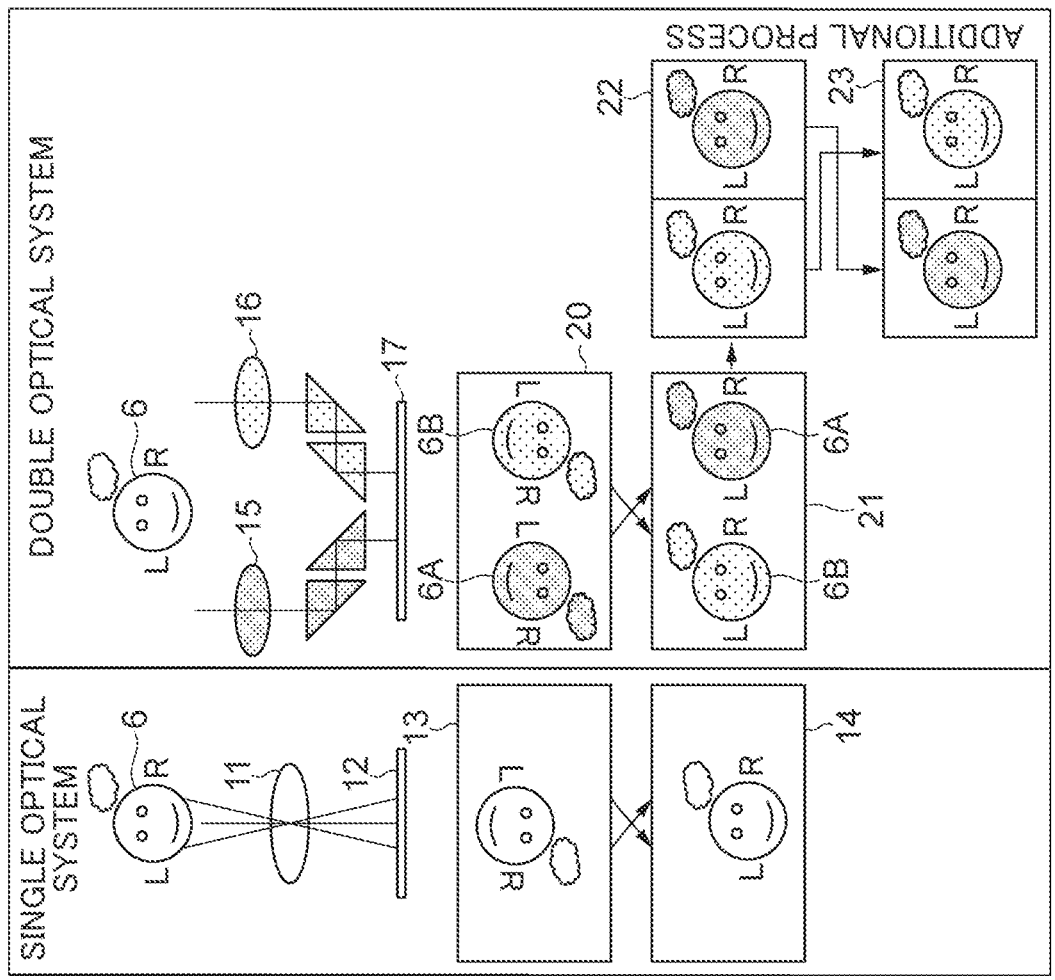
FIG. 6
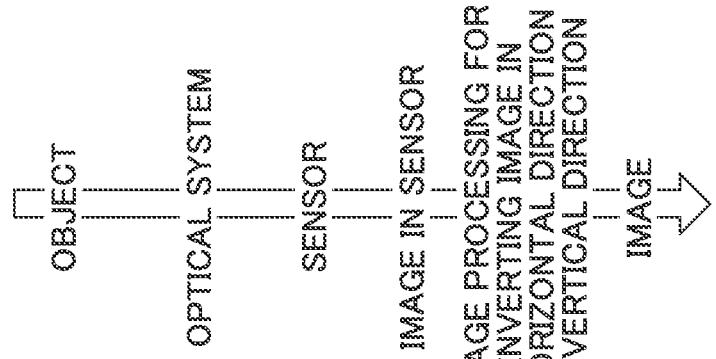

IMAGE PROCESSING APPARATUS THAT PERFORMS PROCESSING CONCERNING DISPLAY OF STEREOSCOPIC IMAGE, IMAGE PROCESSING METHOD, AND STORAGE MEDIUM

BACKGROUND OF THE INVENTION

Field of the Invention

The present invention relates to an image processing apparatus that performs processing concerning display of a stereoscopic image, an image processing method, and a storage medium.

Description of the Related Art

In recent years, a head mount display which enables a user to view a stereoscopic image has come into wide-spread use. Further, a stereoscopic image can be photographed by using a camera to which a lens unit with a multiple optical system, such as a lens unit with a double optical system, is attached. As a related art, there has been proposed a technique in Japanese Laid-Open Patent Publication (Kokai) No. 2004-120527. The technique disclosed in Japanese Laid-Open Patent Publication (Kokai) No. 2004-120527 relates to a double optical system digital camera that is configured to capture the same object using two photographic optical systems and cause images of the same object to be formed in two solid-state image capturing devices, respectively, whereby the two solid-state image capturing devices generate image signals, respectively. Further, there has been proposed a technique in Japanese Laid-Open Patent Publication (Kokai) No. 2019-029721. The technique disclosed in Japanese Laid-Open Patent Publication (Kokai) No. 2019-029721 relates to a head mount display that is configured to show a stereoscopic video to a user by using an image for the right eye and an image for the left eye.

Incidentally, in a case where an image capturing apparatus having a lens unit with a multiple optical system, such as a lens unit with a double optical system, attached thereto causes light from different optical systems to form images on one sensor, an object image through an optical system located on the right side is formed in a right-side area of the sensor, and an object image through an optical system located on the left side is formed in a left-side area of the sensor. At this time, the object images are each formed in a state inverted in a vertical direction and a horizontal direction, and hence the orientation of each object image can be corrected by reading out image data obtained by this sensor such that each object image is inverted in the vertical direction and the horizontal direction. However, if the image data is read out as described above, the image data is changed into image data in which an object image generated using the right-side optical system is positioned on the left side and an object image generated using the left-side optical system is positioned on the right side. That is, differently from a case where an object image is photographed using two photographic optical systems and two image capturing devices, the left and right positions of the object images associated with the respective photographic optical systems are reversed. If this image data in which the left and right positions of the object images are reversed is displayed on a head mount display configured to display a stereoscopic image using images photographed using two photographic optical systems and two image capturing devices, the stereoscopic image cannot be normally displayed. This is because the area of image data photographed by the left-side optical system is processed as image data for the right eye and the area of image data photographed by the right-side optical system is processed as image data for the left eye.

SUMMARY OF THE INVENTION

The present invention provides an image processing apparatus that performs processing concerning the display of a stereoscopic image, which is improved in the user-friendliness when viewing a stereoscopic image, an image processing method, and a storage medium.

In a first aspect of the present invention, there is provided an image processing apparatus including at least one processor, and a memory coupled to the at least one processor, the memory having instructions that, when executed by the processor, perform the operations as: a display control unit configured to cause a display unit to display a stereoscopic image, using image data including a plurality of images having different viewpoints, and an image processing unit configured to process the image data based on metadata attached to the image data, wherein in a case where information indicating that the image data is associated with a file format which cannot cause the display unit to perform display is included in the metadata, the image processing unit performs processing for converting the image data into a file format which can cause the display unit to perform display.

In a second aspect of the present invention, there is provided an an image processing apparatus, including at least one processor, and a memory coupled to the at least one processor, the memory having instructions that, when executed by the processor, perform the operations as: a display control unit configured to cause a display unit to display a stereoscopic image, using image data including a plurality of images having different viewpoints, and an image processing unit configured to process the image data based on metadata attached to the image data, wherein in a case where information indicating that the image data is associated with a file format which cannot cause the display unit to perform display is included in the metadata, the image processing unit causes the display unit to perform display using only image data associated with one of the plurality of images having different viewpoints, out of the image data.

In a third aspect of the present invention, there is provided an image processing apparatus including at least one processor, and a memory coupled to the at least one processor, the memory having instructions that, when executed by the processor, perform the operations as: a reception unit configured to receive characteristic information indicative of processing capability of a display unit configured to display a stereoscopic image based on image data including a plurality of images having different viewpoints, and an image processing unit configured to process image data based on metadata attached to the image data, wherein in a case where information indicating that the image data is in a file format associated with the characteristic information is not included in the metadata, the image processing unit performs processing for converting the image data into a file format associated with the characteristic information.

In a fourth aspect of the present invention, there is provided an image processing apparatus including at least one processor, and a memory coupled to the at least one processor, the memory having instructions that, when executed by the processor, perform the operations as: a generation unit configured to generate a file in a predetermined file format using image data generated by an image capturing device, a reception unit configured to receive characteristic information indicative of processing capability of a display unit configured to display a stereoscopic image based on image data including a plurality of images having different viewpoints, and an image processing unit configured to perform, in a case where information associated with capability of performing stereoscopic display using a file generated by the generation unit is not included in the characteristic information, processing for converting the file generated by the generation unit into a file format which can cause the display unit to perform stereoscopic display.

In a fifth aspect of the present invention, there is provided an image processing method including performing image processing for processing image data including a plurality of images having different viewpoints based on metadata attached to the image data, and causing a display unit to display a stereoscopic image using image data, wherein the image processing includes processing for converting, in a case where information indicating that the image data is associated with a file format which cannot cause the display unit to perform display is included in the metadata, the image data into a file format which can cause the display unit to perform display.

In a sixth aspect of the present invention, there is provided an image processing method including receiving characteristic information indicative of processing capability of a display unit configured to display a stereoscopic image based on image data including a plurality of images having different viewpoints, and performing image processing for processing the image data based on metadata attached to the image data, wherein the image processing includes processing for converting, in a case where information indicating that the image data is in a file format associated with the characteristic information is not included in the metadata, the image data into a file format associated with the characteristic information.

In a seventh aspect of the present invention, there is provided an image processing method including receiving characteristic information indicative of processing capability of a display unit configured to display a stereoscopic image based on image data including a plurality of images having different viewpoints, generating a file in a predetermined file format using image data generated by an image capturing device, and converting, in a case where information associated with capability of performing stereoscopic display using the generated file is not included in the characteristic information, the generated file into a file format which can cause the display unit to perform stereoscopic display.

According to the present invention, it is possible to improve the convenience of a user in viewing a stereoscopic image.

Further features of the present invention will become apparent from the following description of exemplary embodiments (with reference to the attached drawings).

BRIEF DESCRIPTION OF THE DRAWINGS

FIG. 6 is a diagram showing a first example of the photographing principle.

DESCRIPTION OF THE EMBODIMENTS

The present invention will now be described in detail below with reference to the accompanying drawings showing embodiments thereof. However, the component elements described in the following embodiments are described only by way of example, and are by no means intended to limit the scope of the present invention.

Figure 1:
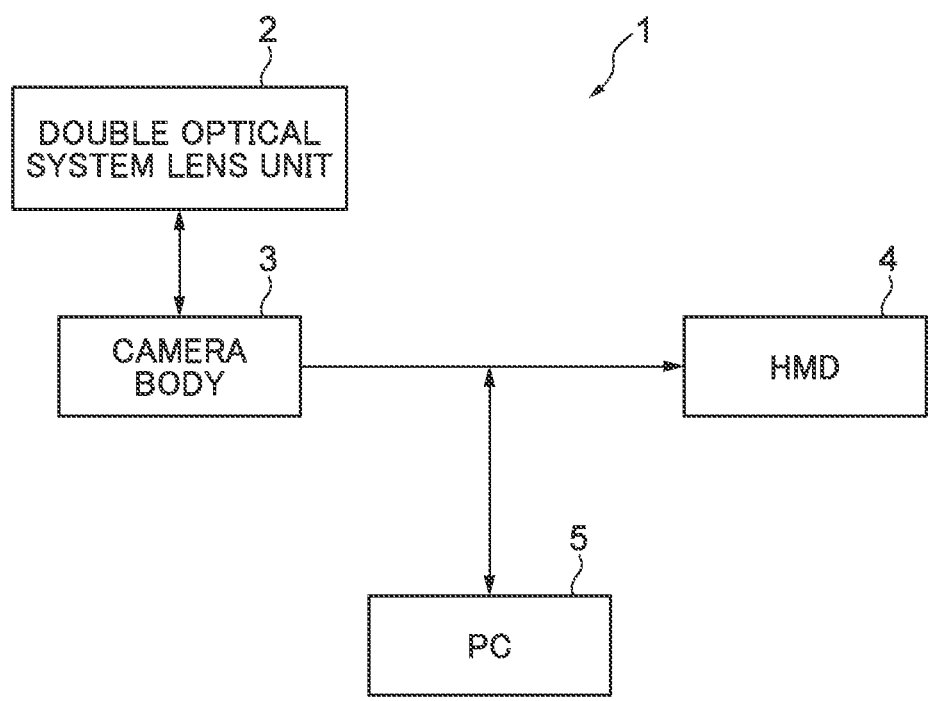
FIG. 1 is a diagram showing an example of a system.

First, a first embodiment will be described. FIG. 1 is a diagram showing an example of a system 1. The system 1 includes a lens unit with a double optical system (hereafter referred to as "the double optical system lens unit") 2, a camera body 3, and a head mount display 4. A personal computer 5 is further added to this system 1 on an as needed basis. The double optical system lens unit 2 is an interchangeable lens unit which can be attached and detached to and from the camera body 3. The camera body 3 is a general camera body to and from which an interchangeable lens unit with a single optical system, such as a zoom lens and a fixed focal length lens, can be attached and detached. An image capturing apparatus is formed by attaching the interchangeable lens unit to the camera body 3. In a case where a lens unit with a multiple optical system is attached to the camera body 3, as described hereinafter, light from a plurality of optical systems is guided to one sensor. The interchangeable lens unit attached to the camera body 3 is not limited to a lens unit with a double optical system, but may be a lens unit with a triple or more multiple optical system. In the system 1, image data generated by photographing an object in a state in which the double optical system lens unit 2 is attached to the camera body 3 is sent to the head mount display 4. The head mount display 4 displays a stereoscopic image. In each of relevant ones of the accompanying figures, the head mount display is denoted as "HMD", and the personal computer is denoted as "PC".

In the illustrated example in FIG. 1, the camera body, 3, the head mount display 4, and the personal computer 5 can communicate with one another. Image data generated by the camera body 3 is transmitted to the head mount display 4. Before transmitting the image data to the head mount display 4, the image data may be processed by the personal computer 5. The head mount display 4 and the personal computer 5 may acquire image data via a portable recording medium, such as a memory card, connected to the camera body 3. In a case where the image data acquired from the camera body 3 can be displayed as a stereoscopic image, the head mount display 4 displays the stereoscopic image. The personal computer 5 is capable of performing a predetermined process on the image data, for displaying a stereoscopic image.

The image capturing apparatus having the double optical system lens unit 2 attached to the camera body 3 is capable of photographing a plurality of images having different viewpoints, which are to be used for display of a stereoscopic image. The camera body 3 has one sensor, and hence an image obtained through an optical system of the double optical system lens unit 2 for the left eye is formed in a left-side area of the sensor in a state inverted in a vertical direction (up-down direction) and a horizontal direction (left-right direction). This is referred to as the left-eye image. Further, an image obtained through an optical system of the double optical system lens unit 2 for the right eye is formed in a right-side area of the sensor in a state inverted in the vertical direction and the horizontal direction. This is referred to as the right-eye image. To correct the orientation of the image data in the vertical and horizontal directions, if the image data is read out such that the vertical and horizontal directions are reversed, the read image data is in a state in which the left-eye image and the right-eye image have changed their positions in the left-right direction, i.e. in a state in which a relationship between the left and right positions is reversed. To cope with this inconvenience, the camera body 3 of the present embodiment adds metadata indicating that the left and right positions of the left-eye image and the right-eye image are reversed to the image data.

On the other hand, in a case where photographing is performed by using a double optical system camera having two sets of one photographing optical system and one image capturing device in each set, the left and right positions of the left-eye image and the right-eye image are not reversed, and hence the metadata indicating the reversed state is not added to the image data. Further, in a case where photographing is performed not by attaching a lens unit with a double optical system, but by attaching a lens unit with a single optical system, to the camera, the metadata indicating the reversed state is not added to the image data, either.

Figure 2:
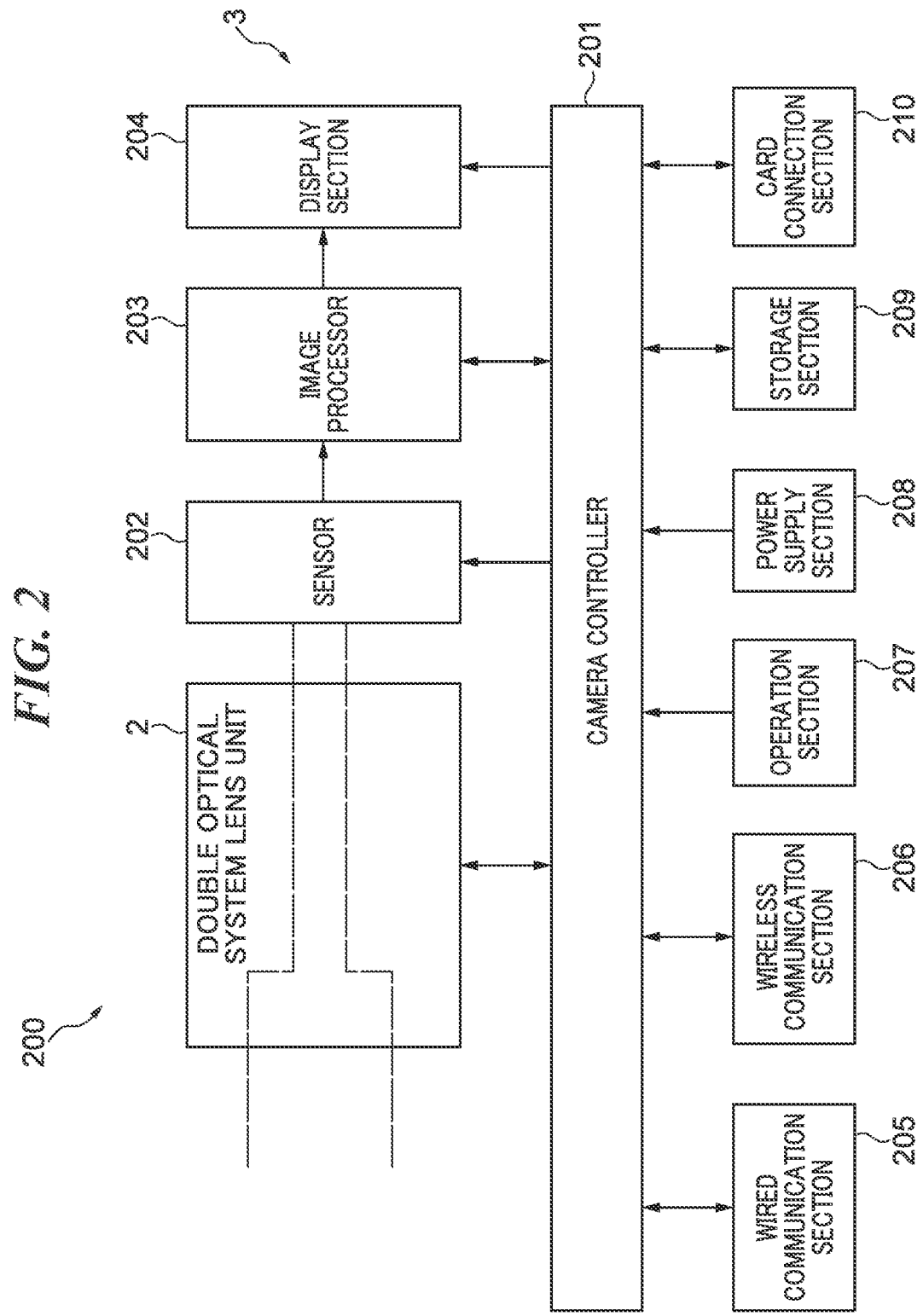
FIG. 2 is a diagram showing an example of an image capturing apparatus.

FIG. 2 is a diagram showing an example of the image capturing apparatus, denoted by reference numeral 200. The image capturing apparatus 200 of the example shown in FIG. 2 has the double optical system lens unit 2, as an interchangeable lens unit, attached to the camera body 3. The image capturing apparatus 200 or the camera body 3 can form an image processing apparatus. In the image capturing apparatus 200 shown in FIG. 2, components other than the double optical system lens unit 2 form the camera body 3. Details of the double optical system lens unit 2 will be described hereinafter. The camera body 3 includes a camera controller 201. To the camera controller 201, a sensor 202, an image processor 203, a display section 204, a wired communication section 205, a wireless communication section 206, an operation section 207, a power supply section 208, a storage section 209, and a card connection section 210 are connected. The sensor 202 is an image sensor implemented by a CCD or CMOS sensor. Further, when the double optical system lens unit 2 is attached to the camera body 3, the camera controller 201 and the double optical system lens unit 2 are electrically connected to each other. For example, the double optical system lens unit 2 communicate various control signals with the camera controller 201 by communication via an electrical contact provided on a lens mount of the camera body 3.

The camera controller 201 has a CPU and a memory. The memory stores control programs, which are executed by the CPU, whereby a variety of control of the camera controller 201 are realized. The sensor 202 as an image capturing device photoelectrically converts object images formed by two image capturing optical systems of the double optical system lens unit 2 and generates image capturing signals. As shown in FIG. 2, light guided from the two image capturing optical systems of the double optical system lens unit 2 forms images in one sensor 202. The image processor 203 performs various image processing operations on the generated image capturing signals to generate image data. The display section 204 is capable of displaying through images by displaying the image data output from the image processor 203. Further, the display section 204 is also capable of displaying image capturing parameters and reproducing captured images stored in the storage section 209.

The wired communication section 205 performs wired communication with the head mount display 4, the personal computer 5, and the like. The wireless communication section 206 performs wireless communication with the head mount display 4, the personal computer 5, and the like. As the methods of wired communication and wireless communication, desired methods can be applied. The operation section 207 receives a user operation performed on the various operation members of the camera body 3. Examples of the operation members include a power supply operation section, a mode dial, a release button, a rear-side operation section, and a touch panel of the display section 204. The power supply section 208 supplies electrical power to the double optical system lens unit 2 and the camera body 3. The storage section 209 stores a variety of information. For example, the storage section 209 stores the control programs executed by the CPU of the camera controller 201, photographed images, and so forth. The card connection section 210 is a connection section for connecting to a portable recording medium, such as a memory card. The camera body 3 is not limited to the example appearing in FIG. 2.

Figure 3:
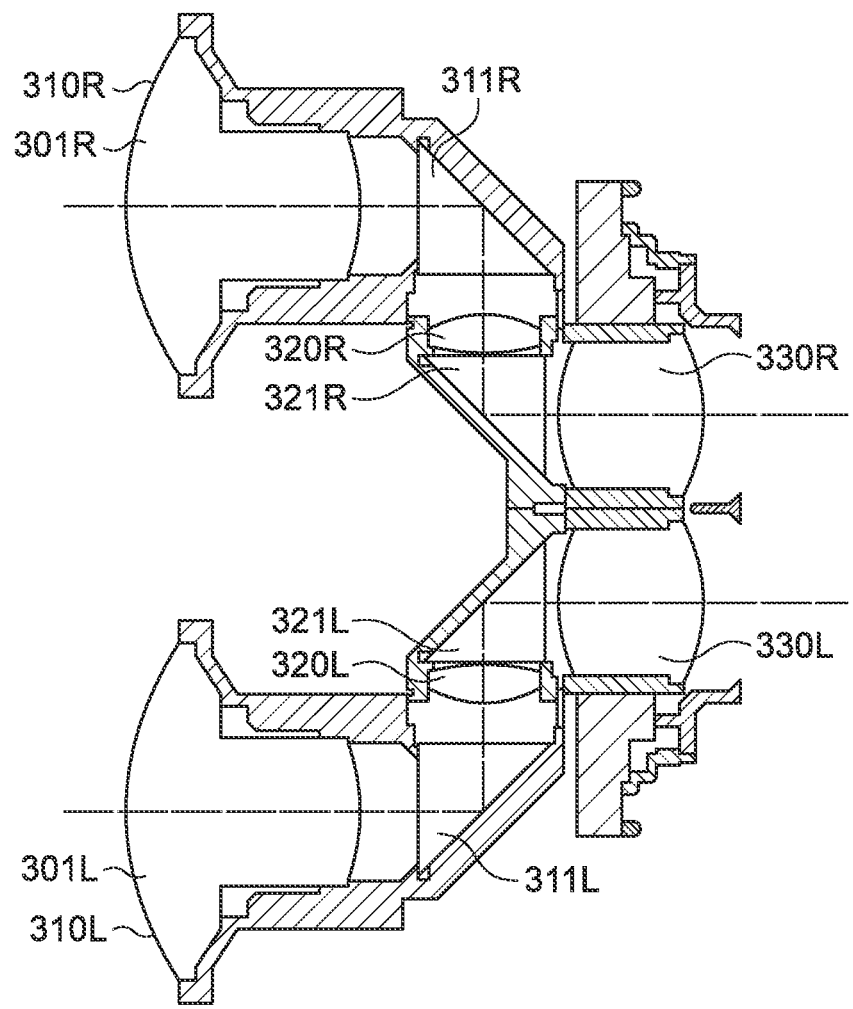
FIG. 3 is a cross-sectional view showing an example of a lens unit with a double optical system.

Next, the interchangeable double optical system lens unit 2 will be described. FIG. 3 is a cross-sectional view showing an example of the interchangeable double optical system lens unit 2. The double optical system lens unit 2 has a right-side optical system 301R and a left-side optical system 301L. The right-side optical system 301R and the left-side optical system 301L are two optical systems which are symmetrically arranged in parallel to each other. The right-side optical system 301R and the left-side optical system 301L each guide light from an object side toward the image capturing side along an optical axis thereof. The right-side optical system 301R has a first group lens 310R, a second group lens 320R, and a third group lens 330R, arranged therein. Further, the right-side optical system 301R has a first prism 311R and a second prism 321R, arranged therein. Light incident through the first group lens 310R of the right-side optical system 301R has its optical path bent by the first prism 311R and the second prism 321R and is guided to the third group lens 330R.

The left-side optical system 301L has a first group lens 310L, a second group lens 320L, and a third group lens 330L, arranged therein. Further, the left-side optical system 301L has a first prism 311L and a second prism 321L, arranged therein. Light incident through the first group lens 310L of the left-side optical system 301L has its optical path bent by the first prism 311L and the second prism 321L and is guided to the third group lens 330L. Thus, the light incident through the right-side optical system 301R and the left-side optical system 301L is guided to the sensor 202.

The configuration of the interchangeable double optical system lens unit 2 is not limited to the example shown in FIG. 3.

Figure 4:
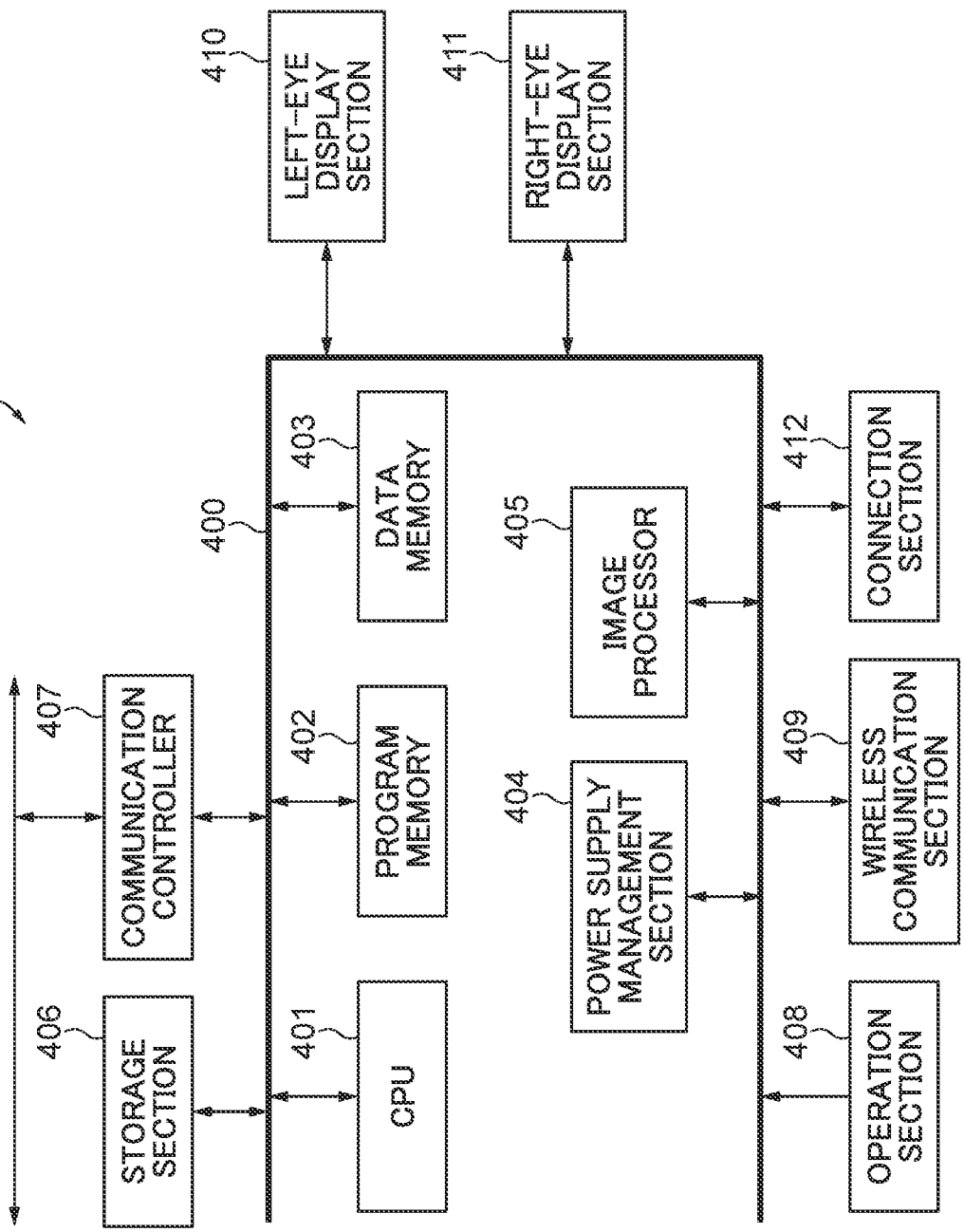
FIG. 4 is a diagram showing an example of a head mount display.

Next, the head mount display 4 will be described. FIG. 4 is a diagram showing an example of the head mount display 4. The head mount display 4 is a display device that displays a stereoscopic image. A user can view a stereoscopic image by attaching the head mount display 4 to the camera body 3. The device for viewing a stereoscopic image is not limited to the head mount display, but may be a stand alone display.

As shown in FIG. 4, components, described below, of the head mount display 4 are connected to a bus 400. A CPU 401 is a central processing unit that executes control programs stored in a program memory 402. The CPU 401 performs a process, described hereinafter, for replacing a left-eye image and a right-eye image, included in image data, with each other. Further, the CPU 401 performs a variety of control. A controller (image processing unit) of the head mount display 4 may be formed by the components appearing in FIG. 4 other than a left-eye display section 410 and a right-eye display section 411. The program memory 402 stores the control programs. A data memory 403 stores setting conditions of the head mount display 4. Further, the data memory 403 stores a still image and a moving image which are photographed by the image capturing apparatus 200 and information associated with these.

A power supply management section 404 manages the state of power supply to the head mount display 4. An image processor 405 reads a still image or moving image and performs predetermined image processing on the read still image or moving image. The still image or moving image on which image processing has been performed by the image processor 405 is output to associated components via the bus 400. A storage section 406 stores a moving image and a still image photographed and formatted by the image capturing apparatus 200 that has the double optical system lens unit 2 attached to the camera body 3. A communication controller 407 is a controller that performs wired communication with the camera body 3 and the personal computer 5.

An operation section 408 receives various instructions for the head mount display 4 provided by a user. For example, the operation section 408 receives conditions for viewing a stereoscopic image on the head mount display 4, an operation for replacing a battery, and so forth. A wireless communication section 409 performs wireless communication with the camera body 3 and the personal computer 5. A connection section 412 connects a portable recording medium, such as a memory card, which can be connected to the camera body 3 and the personal computer 5.

As described above, the double optical system lens unit 2 as the interchangeable lens unit has the right-side optical system 301R and the left-side optical system 301L. The sensor 202 generates image data including a left-eye image and a right-eye image. The left-eye display section 410 is positioned in front of a user's left eye when the user attaches the head mount display 4, and displays a left-eye image of image data. The right-eye display section 411 is positioned in front of a user's right eye when the user attaches the head mount display 4, and displays a right-eye image of image data.

Next, the personal computer 5 will be described. The personal computer 5 can form an image processing apparatus (or an information processing apparatus) that performs predetermined processing on a still image or moving image photographed by the image capturing apparatus 200. As the image processing apparatus, not the personal computer 5, but a predetermined server (such as a cloud server or an edge computer) may be applied, or a smart device, such as a smartphone, may be applied.

Figure 5:
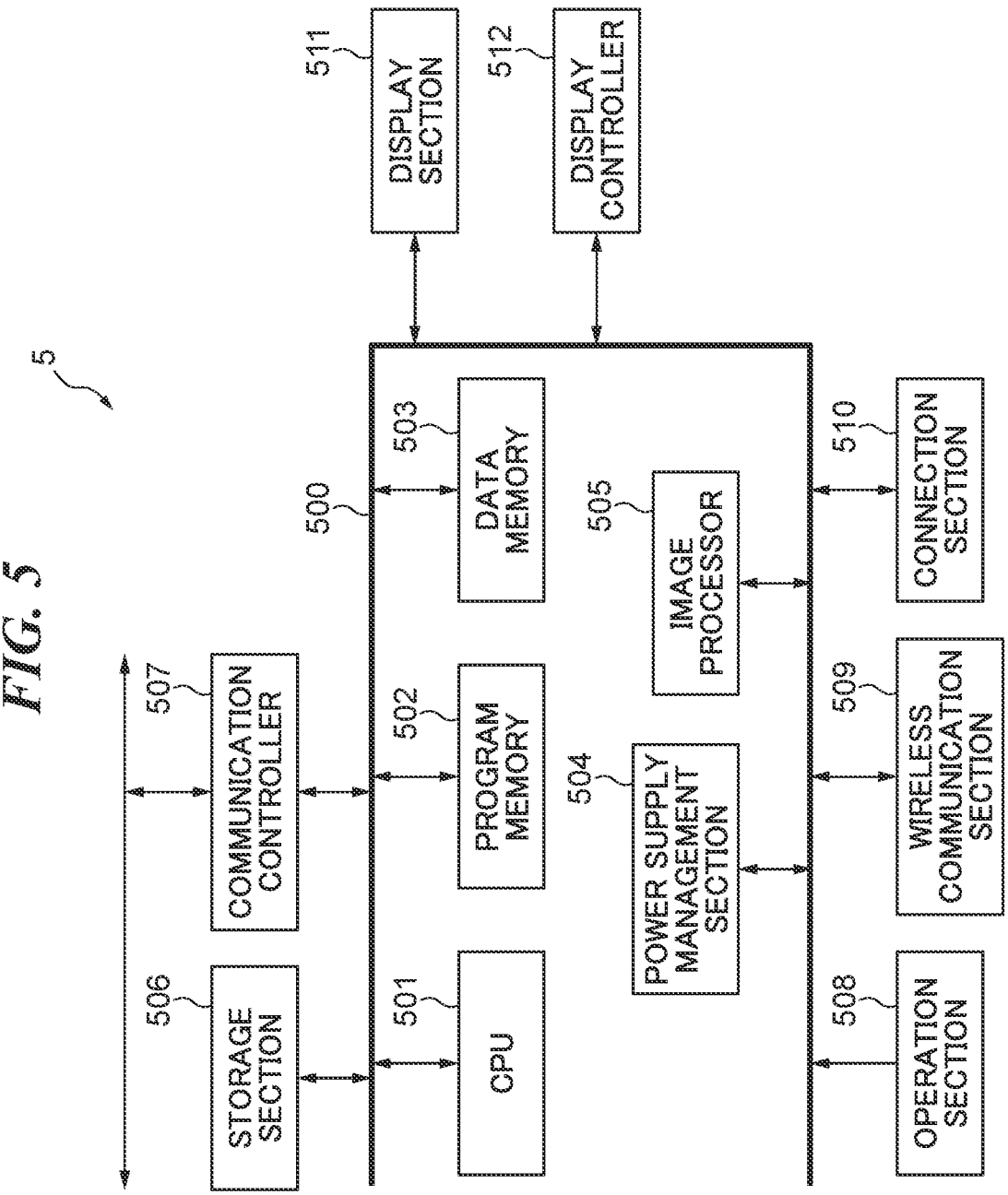
FIG. 5 is a diagram showing an example of a personal computer.

FIG. 5 is a diagram showing an example of the personal computer 5. Components, described below, of the personal computer 5 are connected to a bus 500. A CPU 501 is a central processing unit that executes control programs stored in a program memory 502. The CPU 501 performs a variety of control including control of a display controller 512. The CPU 501 further performs a process for replacing a left-eye image and a right-eye image with each other. The program memory 502 stores the above-mentioned control programs. A data memory 503 stores setting conditions of the personal computer 5. Further, the data memory 503 stores a still image and a moving image acquired from the camera body 3, and information associated with these.

A power supply management section 504 manages a state of power supply to the personal computer 5. An image processor 505 reads a still image or moving image and performs predetermined image processing on the read still image or moving image. The image processor 505 may be configured to perform the process for replacing a left-eye image and a right-eye image with each other in place of the CPU 501. The still image or moving image on which image processing has been performed by the image processor 505 is output to the components via the bus 500. A storage section 506 stores a moving image and a still image photographed and formatted by the image capturing apparatus 200 that has the double optical system lens unit 2 attached to the camera body 3. A communication controller 507 is a controller that performs wired communication with the camera body 3 and the head mount display 4.

An operation section 508 receives various instructions for the personal computer 5 provided by a user. For example, as the operation section 508, a keyboard, a mouse, and so forth, are applied. A wireless communication section 509 performs wireless communication with the camera body 3 and the personal computer 5. A connection section 510 connects a portable recording medium, such as a memory card, which can be connected to the camera body 3 and the personal computer 5.

A display section 511 displays a variety of information of the personal computer 5. The display section 511 can also display a still image and a moving image photographed by the image capturing apparatus 200. The display controller 512 controls the display of the display section 511.

Next, a first example of the photographing principle will be described. FIG. 6 is a diagram showing the first example of the photographing principle. In FIG. 6, "single optical system" indicates an example of a case where photographing is performed in a state in which a lens unit with a single optical system is attached to the camera body 3. Further, in FIG. 6, "double optical system" indicates an example of the present embodiment in which photographing is performed in a state in which the double optical system lens unit 2 is attached to the camera body 3. First, the single optical system will be described. When an object 6 is photographed in a state in which the lens unit with a single optical system is attached to the camera body 3, an image of the object 6 is formed in a sensor 12 through a lens 11. At this time, an image 13 which is inverted in a horizontal direction and a vertical direction is generated in the sensor 12. At this time, when the image data is read out from the sensor 12, by performing processing for inverting the image data in the horizontal direction and the vertical direction, an image 14 properly orientated in the horizontal direction and the vertical direction is acquired. Note that the processing for inverting the image data in the horizontal direction and the vertical direction may be performed after reading out the image data from the sensor 12 and storing the read image data in the memory.

Next, an example of a case where photographing is performed in a state in which the double optical system lens unit 2 is attached to the camera body 3 and then an "additional process" of the present embodiment is performed will be described. When the object 6 is photographed in the state in which the double optical system lens unit 2 is attached to the camera body 3, an object image 6A which is inverted in the vertical direction and the horizontal direction is formed in a left-side area of a sensor 17 through a left-side lens 15 (lens of the above-mentioned left-side optical system 301L). At the same time, an object image 6B which is inverted in the vertical direction and the horizontal direction is formed in a right-side area of the sensor 17 through a right-side lens 16 (lens of the above-mentioned right-side optical system 301R). As a result, image data 20 including the object image 6A formed through the left-side lens 15 and the object image 6B formed through the right-side lens 16 each in the state inverted in the horizontal direction and the vertical direction is generated. By reading out this image data 20 by inverting the same in the horizontal direction and the vertical direction, image data 21 in which the orientations of the object image 6A and the object image 6B in the vertical direction and the horizontal direction have been corrected is generated.

Here, the object image 6A and the object image 6B, included in the image data 21, are reversed (replaced) in position from each other in the horizontal direction. That is, the object image 6B associated with the right-side lens 16 exists in the left-side area of the image data 21 and the object image 6A associated with the left-side lens 15 exists in the right-side area of the image data 21.

Therefore, if the head mount display 4 displays a stereoscopic image using this image data 21 as it is, image data including the object image 6B associated with the right-side lens 16 is input to the left-eye display section 410. Similarly, image data including the object image 6A associated with the left-side lens 15 is input to the right-eye display section 411. Therefore, the user cannot normally view the stereoscopic image.

To prevent this, the CPU 401 of the head mount display 4 generates image data 22 by dividing the image data 21 into two parts in the horizontal direction and then generates image data 23 in which the positions of the two images included in the image data 22 in the horizontal direction are replaced with each other. With this, image data including the object image 6A associated with the left-side lens 15 and positioned in the left-side area of the image data 23 is input to the left-eye display section 410 of the head mount display 4. Further, image data including the object image 6B associated with the right-side lens 16 and positioned in the right-side area of the image data 23 is input to the right-eye display section 411. By doing this, the user can normally view the stereoscopic image.

Figure 7:
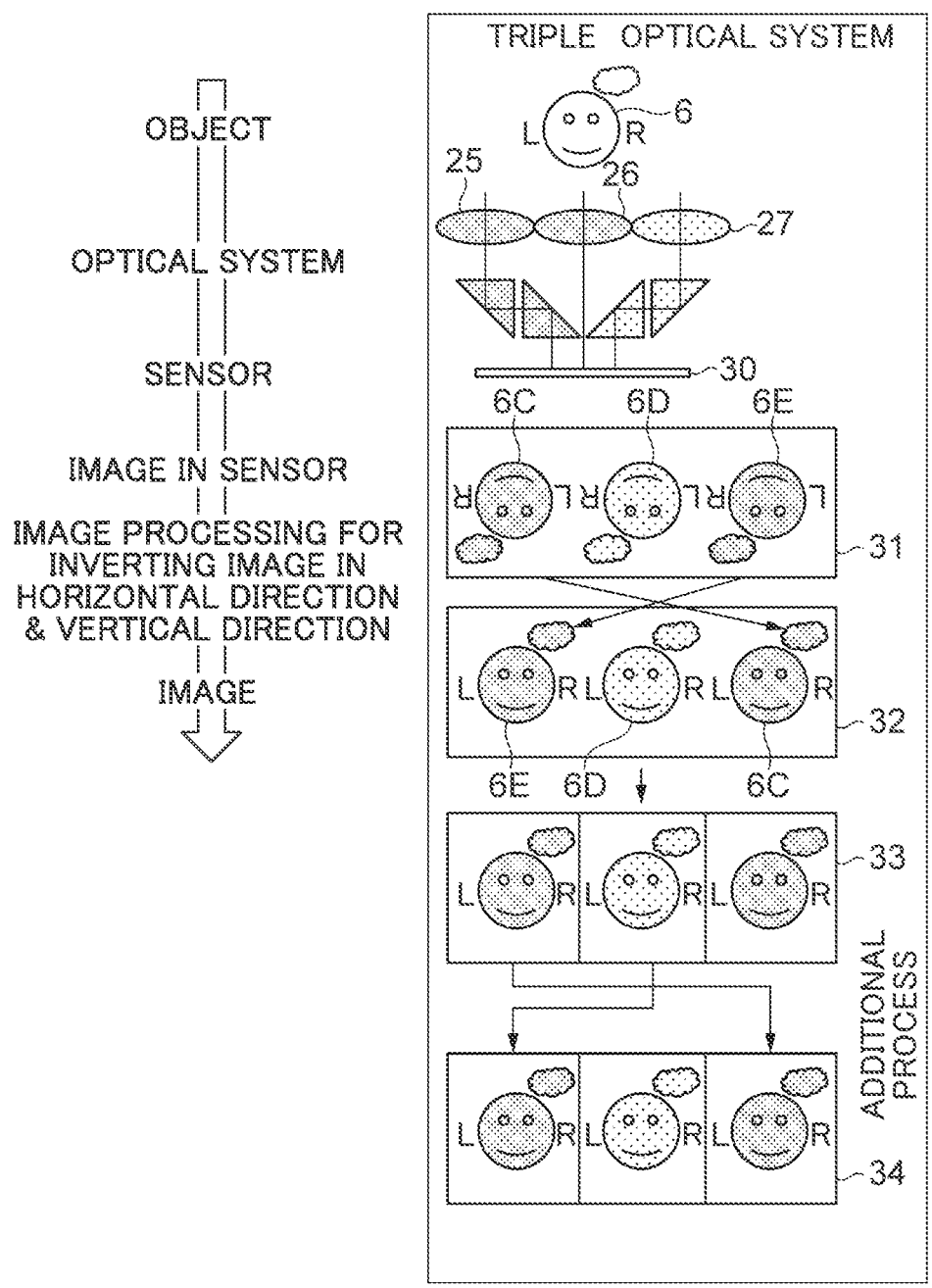
FIG. 7 is a diagram showing a second example of the photographing principle.

FIG. 7 is a diagram showing a second example of the photographing principle. FIG. 7 is a diagram showing an example of the present embodiment in a case where photographing is performed in a state in which a lens unit with a triple optical system is attached to the camera body 3. The lens unit with a triple optical system has three lenses, i.e. a left-side lens 25, a center lens 26, and a right-side lens 27. When the object 6 is photographed in the state in which the lens unit with a triple optical system is attached to the camera body 3, an object image 6C which is inverted in the vertical direction and the horizontal direction is formed in a left-side area of a sensor 30 through the left-side lens 25. An object image 6D which is inverted in the vertical direction and the horizontal direction is formed in a central area of the sensor 30 through the center lens 26. An object image 6E which is inverted in the vertical direction and the horizontal direction is formed in a right-side area of the sensor 30 through the right-side lens 27. As a result, image data 31 including the object image 6C associated with the left-side lens 25, the object image 6D associated with the center lens 26, and the object image 6E associated with the right-side lens 27 each in the state inverted in the horizontal direction and the vertical direction is generated. By reading out this image data 31 by inverting the same in the horizontal direction and the vertical direction, image data 32 in which the orientations of the object image 6C the object image 6D, and the object image 6E in the vertical direction and the horizontal direction have been corrected is generated.

Then, the CPU 401 of the head mount display 4 of the present embodiment performs the following process as the additional process: The CPU 401 generates image data 33 by dividing the image data 32 into three parts in the horizontal direction, and generates image data 34 in which the positions of the two images of the image data 33 in the horizontal direction, i.e. the object image 6C positioned in the right-side area of the image data 33 and the object image 6E positioned in the left-side area of the image data 33 are replaced with each other. By changing a combination of two object images selected to be used for a stereoscopic image from the object images obtained through the left-side lens 25, the object image obtained through the center lens 26, and the object image obtained through the right-side lens 27, it is possible to display a stereoscopic image having a different viewpoint. Further, it is possible to use the object image obtained through the left-side lens 25 and the object image obtained through the right-side lens 27 for a stereoscopic image and use the object image obtained through the center lens 26 for improvement of the image quality of the stereoscopic image. For example, by changing the exposure setting for the object image obtained through the center lens 26, it is possible to use the object image obtained through the center lens 26, for processing for a pseudo increase of the dynamic range for a saturated portion or a portion where the luminance level is too low to recognize an object image, in the stereoscopic image. With this, the user wearing the head mount display 4 can normally view the stereoscopic image obtained through photographing using the lens unit with a triple optical system.

Note that although the description is given of the lens unit with a double optical system and the lens unit with a triple optical system by way of example, even in a case where a lens unit with a quadruple or more multiple optical system is used, the present invention can be applied.

Here, note that the camera controller 201 of the camera body 3 of the present embodiment is assumed to be capable of determining whether to turn on or off information indicating necessity of replacement of left and right images, according to an interchangeable lens unit attached to the camera body 3. On the other hand, the head mount display 4 includes a type which is equipped with the function of replacing left and right images of image data and a type which is not equipped with this function.

The head mount display 4 having the function of replacing left and right images of image data acquires image data including a right-eye image and a left-eye image and metadata attached to the image data. The right-eye image is an image formed through the right-side optical system 301R, and the left-eye image is an image formed through the left-side optical system 301L. The metadata (attached information) indicates whether or not a right-eye image and a left-eye image included in image data are in the reversed state. In the present embodiment, a case where a right-eye image and a left-eye image are in the reversed state is expressed by "1", and a case where a right-eye image and a left-eye image are not in the reversed state is expressed by "0".

In a case where the metadata indicates that a right-eye image and a left-eye image are not in the reversed state, the head mount display 4 does not replace the right-eye image and the left-eye image included in the image data. Therefore, the right-eye image and the left-eye image are used for display on the left-eye display section 410 and the right-eye display section 411 without being replaced with each other. On the other hand, in a case where the metadata indicates that a right-eye image and a left-eye image included in the image data are in the reversed state, the head mount display 4 generates image data in which the right-eye image and the left-eye image are replaced with each other. Then, the generated image data is stored in the storage section 406 and used for display on the left-eye display section 410 and the right-eye display section 411.

Here, an example of the head mount display 4 which is not equipped with the function of replacing a right-eye image and a left-eye image of image data will be described. In a case where the metadata indicates that a right-eye image and a left-eye image are not in the reversed state, the head mount display 4 directly uses the image data, for display on the left-eye display section 410 and the right-eye display section 411. On the other hand, in a case where the metadata indicates that a right-eye image and a left-eye image are in the reversed state, the head mount display 4 determines whether or not only one of the right-eye image and the left-eye image of the image data can be used for display on both of the left-eye display section 410 and the right-eye display section 411.

For example, in a case where only the left-eye image can be used for display on both of the right-eye display section 411 and the left-eye display section 410, the head mount display 4 performs display using only the left-eye image on both of the right-eye display section 411 and the left-eye display section 410. This prevents the right-eye image from being displayed on the left-eye display section 410 and the left-eye image from being displayed on the right-eye display section 411, and although the image cannot be stereoscopically displayed, it is possible to display an image giving no feeling of strangeness for the user wearing the head mount display 4. In a case where the head mount display 4 is not equipped with the function of displaying only one of a right-eye image and a left-eye image on both of the right-eye display section 411 and the left-eye display section 410, the head mount display 4 is only required to perform an error display. Examples of notification by the error display include a notification to the effect that a stereoscopic image cannot be displayed, a notification to the effect that the format of the image data is not suited to the head mount display, or a notification for prompting a user to use a head mount display having the function of replacing left and right images with each other.

Figure 8:
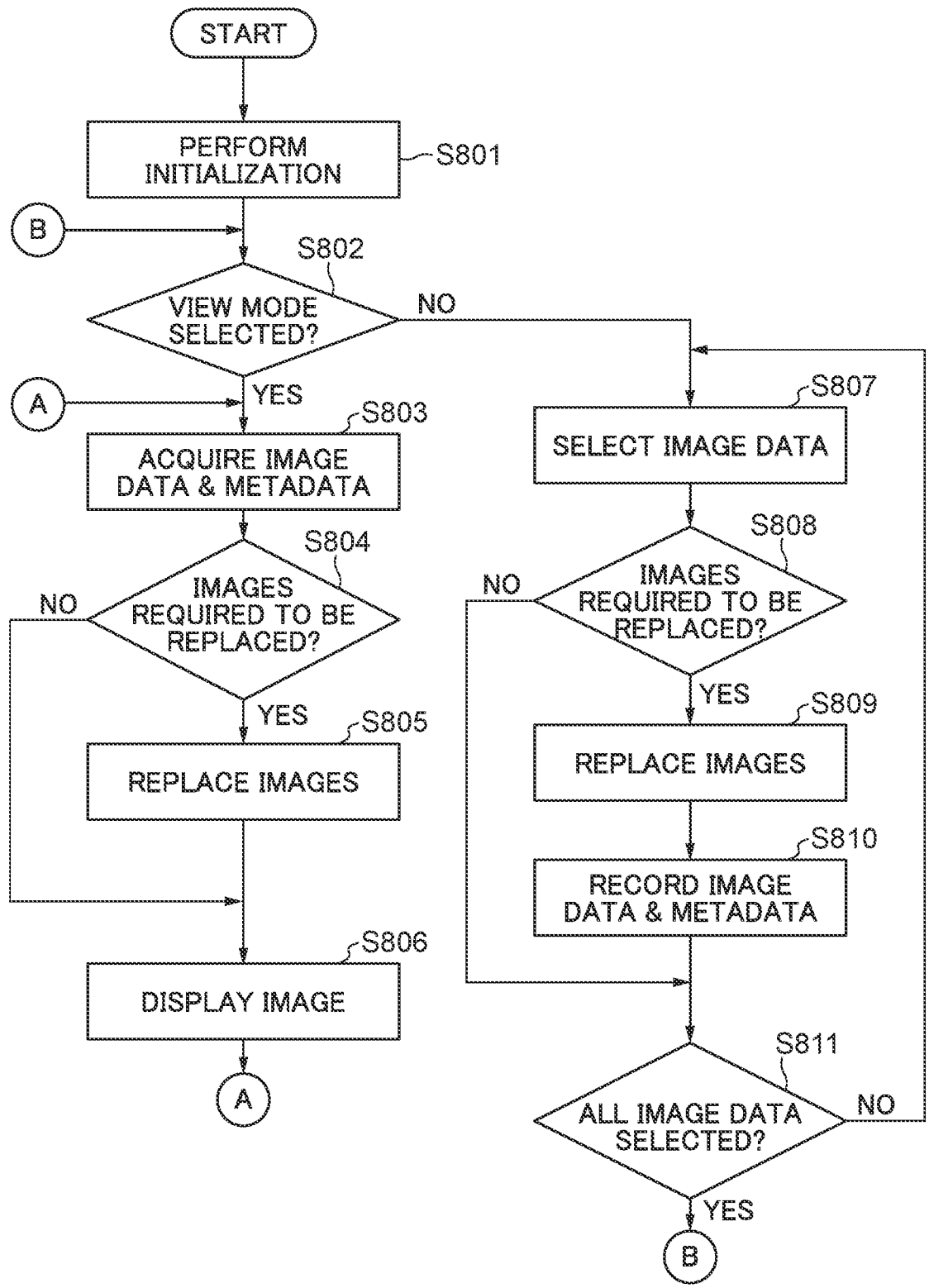
FIG. 8 is a flowchart of an example of a process performed by the head mount display in a first embodiment.

Next, a flow of the process performed by the head mount display 4 in the first embodiment will be described. FIG. 8 is a flowchart of an example of the process performed by the head mount display 4 in the first embodiment. The process in FIG. 8 is terminated when a predetermined condition is satisfied. For example, in a case where power supply to the head mount display 4 is cut off, or a case where an operation termination instruction is provided, the process in FIG. 8 is terminated. This also applies to processes, described hereinafter.

In a step S801, the CPU 401 of the head mount display 4 performs predetermined initialization processing. In a step S802, the CPU 401 determines whether or not an operation for selecting a view mode has been performed. Here, note that in the head mount display 4, one of the view mode and an image selection mode can be selected. For example, the user can select the view mode for viewing a still image or a moving image photographed by the image capturing apparatus 200, using the operation section 408. If the answer to the question of the step S802 is affirmative (YES), the CPU 401 proceeds to a step S803. In the step S803, the CPU 401 acquires a file including image data including a left-eye image and a right-eye image and metadata associated with the image data from the camera body 3 to which the double optical system lens unit 2 is attached.

In a step S804, the CPU 401 determines based on the metadata whether or not the acquired image data is image data which has the left-eye image and the right-eye image which are in the reversed state and is required to replace the left-eye image and the right-eye image with each other. If the answer to the step S804 is negative (NO), the CPU 401 proceeds to a step S806. If the answer to the step S804 is affirmative (YES), the CPU 401 proceeds to a step S805. Here, the CPU 401 may notify the user of a result of the determination in the step S804. For example, the CPU 401 may display a notification to the effect that the left-eye image and the right-eye image are in the reversed state on one or both of the left-eye display section 410 and the right-eye display section 411. Further, the CPU 401 may notify the user of the notification using a voice. The same notification form can be applied to various notifications, referred to hereafter.

In the step S805, the CPU 401 performs image processing on the image data, for replacing the left-eye image and the right-eye image with each other. At this time, the CPU 401 may control the image processor 405 to perform, on the image data, image processing other than the image processing for replacing the left-eye image and the right-eye image with each other. Then, in the step S806, the left-eye display section 410 performs the display using the image included in the left-side area of the image data, and the right-eye display section 411 performs the display using the image included in the right-side area of the image data. Then, the process returns to the step S803.

If the answer to the step S802 is negative (NO), i.e. if it is determined that the image selection mode has been selected, the CPU 401 proceeds to a step S807. In the step S807, the CPU 401 selects one of received image data items which have not been selected yet as a processing target. In this image data selection, the user may be caused to select desired image data or may be caused to select a condition for selecting an image. In a step S808, the CPU 401 determines whether or not the image data selected as the processing target is image data required to replace the left-eye image and the right-eye image with each other. The CPU 401 can perform this determination based on the metadata attached to the image data. If the answer to the step S808 is affirmative (YES), the CPU 401 proceeds to a step S809, whereas if the answer is negative (NO), the CPU 401 proceeds to a step S811.

In the step S809, the CPU 401 replaces the left-eye image and the right-eye image included in the image data. In a step S810, the image data having the left-eye image and the right-eye image replaced with each other is stored in a memory card connected to the connection section 412. The CPU 401 records information indicating that the left-eye image and the right-eye image have been replaced with each other, i.e. information indicating that the left-eye image and the right-eye image are not in the reversed state, in the metadata to be stored in the memory card together with the above-mentioned image data. With this, for example, the image data having the left-eye image and the right-eye image replaced with each other and the metadata in which this fact has been recorded can be used in another device (such as the head mount display 4). Further, the image data and the metadata stored in the memory card may be transmitted to the above-mentioned other device by using wired communication via the communication controller 407 or wireless communication via the wireless communication section 409.

In the step S811, the CPU 401 determines whether or not all image data items have been selected as the processing target, and if the answer to this question is affirmative (YES), the process returns to the step S802, whereas if the answer is negative (NO), the process returns to the step S807.

Note that when the image processing for replacing the left-eye image and the right-eye image is performed in the step S805, similarly to the step S810, the image data having the images replaced with each other and the metadata indicative of this fact may be stored in the memory card.

Figure 9:
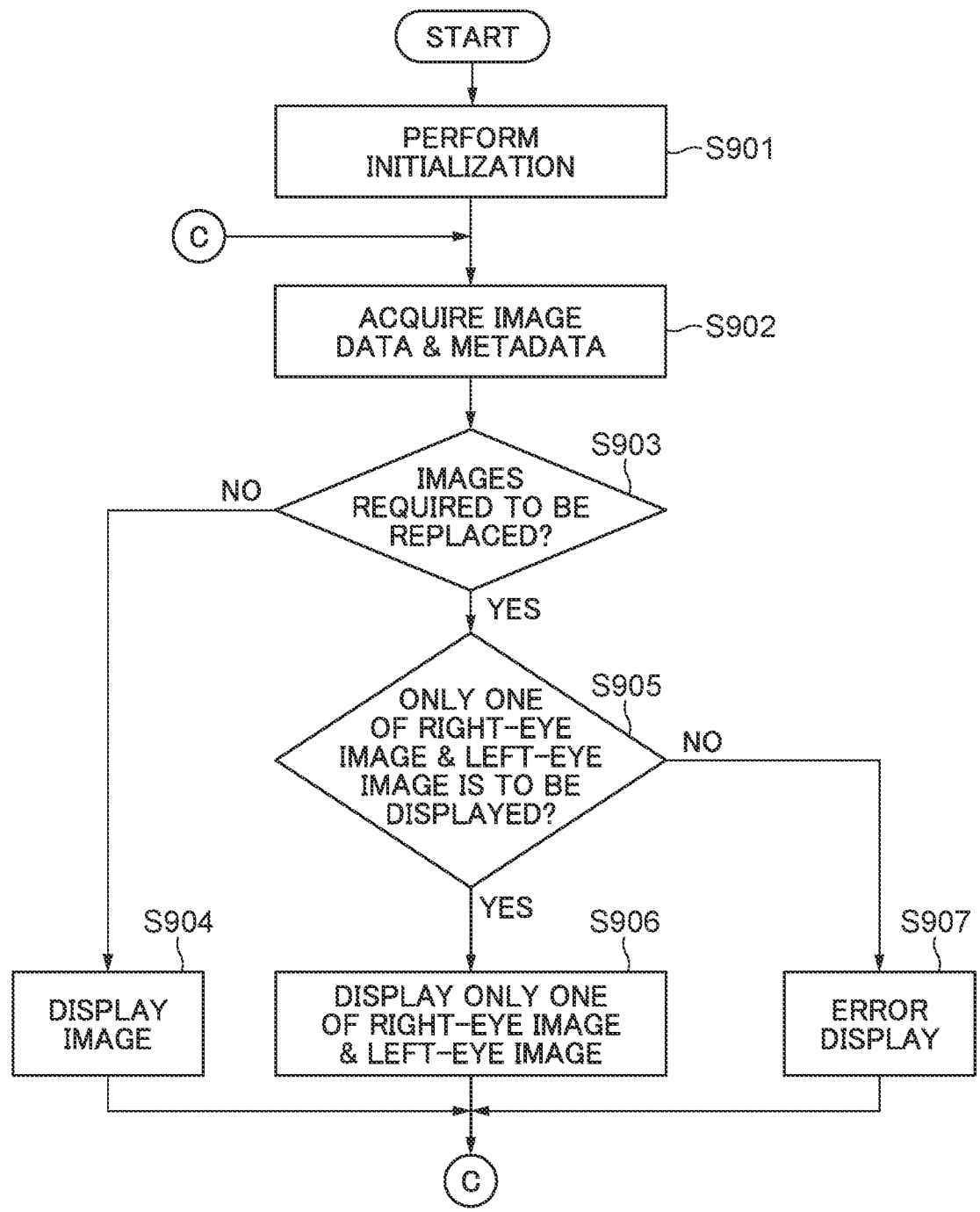
FIG. 9 is a flowchart of an example of a process performed by the head mount display that is not equipped with a function of replacing images with each other.

On the other hand, FIG. 9 is a flowchart of an example of a process performed by the head mount display 4 that is not equipped with the function of replacing images with each other. The process in FIG. 9 will also be briefly described. This head mount display 4 is assumed to be capable of selecting, in a case where a left-eye image and a right-eye image are in the reversed state, whether or not to set a mode for performing the display using only one of the images.

In a step S901, the CPU of this head mount display 4 performs initialization, and in a step S902, image data including a left-eye image and a right-eye image and metadata associated with the image data are acquired. In a step S903, if it is determined based on the metadata that the acquired image data is image data having the right-eye image and the left-eye image which are not in the reversed state and is not required to replace the left-eye image and the right-eye image with each other, the CPU proceeds to a step S904. On the other hand, if it is determined that the acquired image data is image data having the right-eye image and the left-eye image which are in the reversed state, the CPU proceeds to a step S905.

In the step S904, the left-eye display section 410 displays an image using the left-eye image included in the image data, and the right-eye display section 411 displays an image using the right-eye image included in the image data. Then, the process returns to the step S902.

In the step S905, the CPU determines whether or not a mode for displaying an image using only one of the left-eye image and the right-eye image included in the image data is selected, and if the answer to this question is affirmative (YES), the process proceeds to a step S906. In the step S906, both of the left-eye display section 410 and the right-eye display section 411 each display an image using only one of the left-eye image and the right-eye image. The user may be enabled to select which of the images is to be used. If the answer to the question of the step S905 is negative (NO), the process proceeds to a step S907 to perform an error display. In the step S907, a notification to the effect that a stereoscopic image cannot be disabled, a notification to the effect that the format of the image data is not suited to the head mount display 4, a notification for prompting a user to use a head mount display having the function of replacing left and right images with each other, or the like, is displayed.

As described above, in the present embodiment, even when the camera body 3 is not equipped with the function of replacing a left-eye image and a right-eye image with each other, the left-eye image and the right-eye image are replaced with each other by the head mount display 4, whereby it is possible to display a stereoscopic image. In a case where the head mount display 4 has the function of replacing a left-eye image and a right-eye image with each other, whether or not to replace the left-eye image and the right-eye image of image data is determined based on the metadata. Then, this head mount display 4 replaces the left-eye image and the right-eye image of image data with each other if necessary. With this, it is possible to normally view a stereoscopic image irrespective of whether the image data is image data obtained through photographing using a camera that causes the positions of a left-eye image and a right-eye image to be reversed or image data obtained through photographing using a camera that does not cause the positions of a left-eye image and a right-eye image to be reversed.

Next, a second embodiment will be described. Although in the first embodiment, whether or not a left-eye image and a right-eye image are in the reversed state is determined based on the metadata, in the second embodiment, whether or not a left-eye image and a right-eye image are in the reversed state is determined by analyzing not the acquired metadata, but the image data.

In the second embodiment, the step S804 or S808 in FIG. 8, the CPU 401 compares the image included in the left-side area of the image data and the image included in the right-side area of the image data and determines whether or not the positions of the left-eye image and the right-eye image are in the reversed state. The position of the object image 6A in the left-eye image, formed by using the left-side optical system 301L, is shifted in the right direction with respect to the background, compared with the object image 6B in the right-eye image, formed by using the right-side optical system 301R. This is more remarkable as the distance from the camera to the object 6 is shorter. For example, focusing on an object as a target of AF, if the position of the object in the left-side image area of the image data is shifted in the left direction with respect to the background, more than the position of this object in the right-side image area of the image data, it is known that the image data is in a state in which the right-eye image and the left-eye image are reversed. Therefore, the CPU 401 can perform the determination in the step S804 or S808 based on a result of analyzing the position of the object in the left-eye image and the right-eye image.

In the second embodiment, as described above, even when information indicating whether or not a left-eye image and a right-eye image have been replaced with each other is not included in the metadata, it is possible to obtain the same advantageous effects as provided by the first embodiment. The processing operations other than the step S804 or S808 are the same as those of the first embodiment, and hence description thereof is omitted.

Next, a third embodiment will be described. In the present embodiment, there are a plurality of file formats of image data including a left-eye image and a right-eye image for displaying a stereoscopic image, and the metadata of image data indicates a file format associated with the image data. For example, the plurality of file formats are different in whether or not the positions of a left-eye image and a right-eye image are reversed, and whether a left-eye image and a right-eye image are included in one image data or in respective separate different image data items. Further, the plurality of file formats may be different in the number of included images, compression method, or the like. Further, in the present embodiment, a process associated with manipulation and editing of image data, performed by the head mount display 4, is realized by the CPU 401 that executes an application.

If the file format associated with the stereoscopic display is different depending on a manufacturer or a model, the CPU 401 of the head mount display 4 is either capable or incapable of interpreting metadata acquired from the camera body 3 depending on a file format. Further, even when the CPU 401 is capable of interpreting metadata acquired from the camera body 3, the image data of a file format indicated by the metadata can be stereoscopically displayed or cannot be stereoscopically displayed depending on the file format. In the present embodiment, in a case where the metadata associated with the image data cannot be interpreted, or in a case where image data of the corresponding file format cannot be stereoscopically displayed, the CPU 401 transmits a request for upgrading the version of the application to a predetermined application server.

Figure 10:
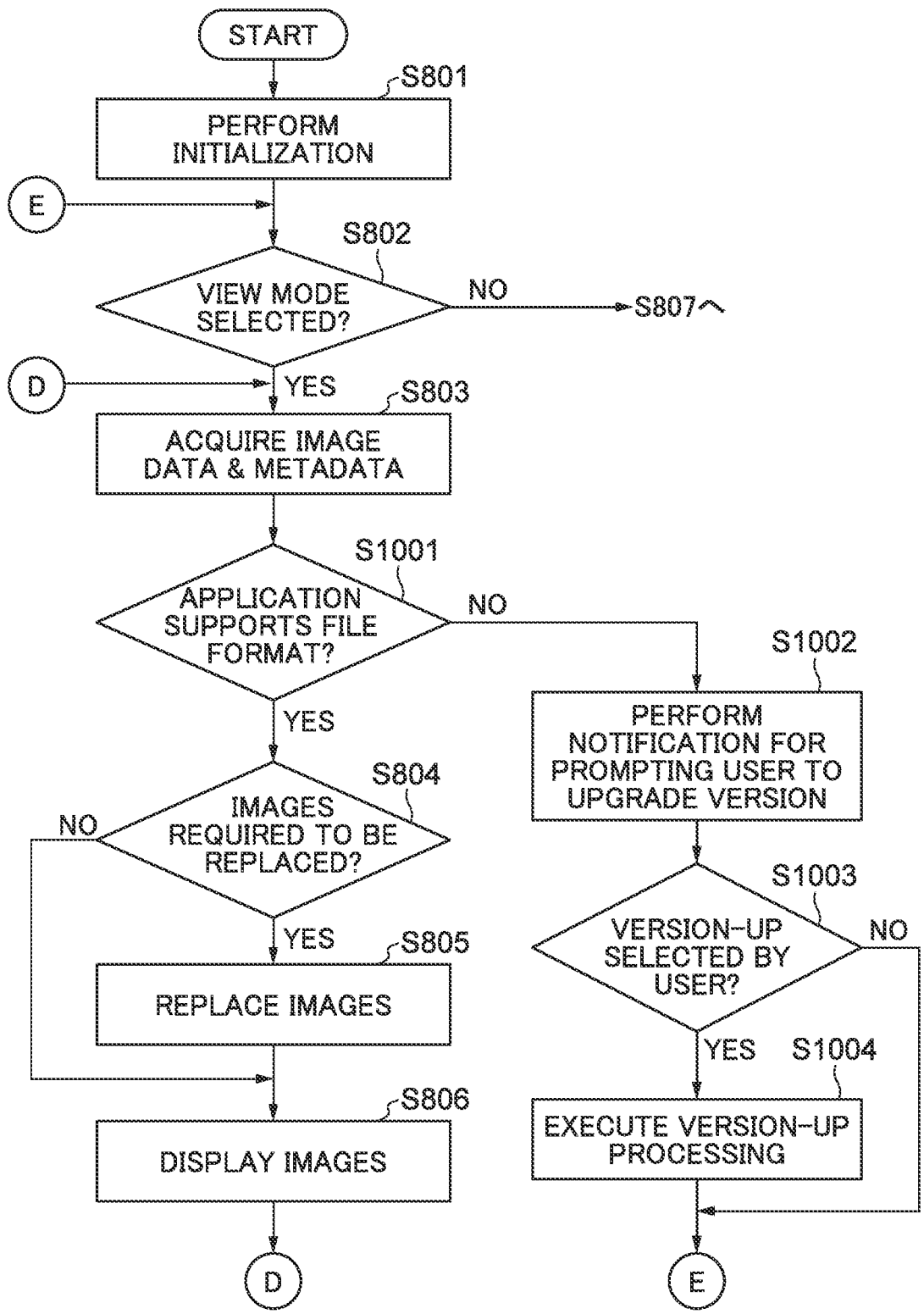
FIG. 10 is a flowchart of an example of a process performed by the head mount display in a third embodiment.

The configuration of the head mount display 4 of the third embodiment is the same as that of the first embodiment, and hence description thereof is omitted. FIG. 10 is a flowchart of an example of a process performed by the head mount display 4 in the third embodiment. The same processing operations as those of the process in FIG. 8 are denoted by the same step numbers, and description of these steps is omitted. In a step S1001 in FIG. 10, the CPU 401 determines whether or not the metadata acquired in the step S803 can be interpreted, and the application of the CPU 401 supports the file format of the acquired image data. If the answer to the question of the step S1001 is affirmative (YES), the CPU 401 proceeds to the step S804.

If the answer to the question of the step S1001 is negative (NO), the CPU 401 proceeds to a step S1002. In the step S1002, the CPU 401 displays a notification to the effect that the acquired image data is image data whose metadata cannot be interpreted or whose file format is not supported by the application. Further, the CPU 401 displays a notification for prompting the user to upgrade the version of the application. For example, the CPU 401 displays a message, such as "The version of the application requires upgrading. Do you upgrade the version?".

If the user does not select upgrading of the version in a step S1003, the CPU 401 returns to the step S802. On the other hand, if the user selects upgrading of the version, the CPU 401 proceeds to a step S1004. In the step S1004, the CPU 401 performs version-up processing. More specifically, the CPU 401 controls the communication controller 407 or the wireless communication section 409 to transmit a version-up request to the external application server existing on the network. The external application server transmits data for version-up for upgrading the application to an application compatible with the file format indicated by the above-mentioned metadata to the head mount display 4 in response to the version-up request. The CPU 401 executes upgrading of the version of the application using the received data. This version-up of the application is performed to enable the right-eye display section 411 and the left-eye display section 410 to display a stereoscopic image using image data of a new file format. Alternatively, the version-up may be performed to enable the application to convert the file format of image data generated by the camera to a file format which can be displayed by the right-eye display section 411 and the left-eye display section 410.

From the above, even in a case where the condition that the metadata acquired in the step S803 can be interpreted and at the same time the file format is supported by the application of the CPU 401 is not satisfied, the left and right images can be replaced with each other. Note that although the description is given of the example in which the CPU 401 upgrades the version of the application in a case where the file format is not suited to the stereoscopic display, this is not limitative. The CPU 401 may upgrade the version of the application in a case where the acquired image data cannot be converted to the file format suited to the stereoscopic display. In this case, the CPU 401 upgrades the version of the application to enable the application to convert the acquired image data to the file format suited to the stereoscopic display.

Next, a fourth embodiment will be described. In the fourth embodiment, the camera body 3 performs the processing for replacing a left-eye image and a right-eye image with each other and the like and the processing for converting a file format of image data, according to the processing capability of the head mount display 4. Further, the head mount display 4 notifies the camera body 3 of characteristic information indicative of the processing capability of the head mount display 4. In a case where the camera body 3 has acquired data associating the model number of the head mount display 4 with its characteristic information in advance, the head mount display 4 may notify the camera body 3 of the information of the model number in place of the characteristic information. As described above, in the fourth embodiment, the camera body 3 performs the processing for converting a file format, including replacement of a left-eye image and a right-eye image, on an as needed basis. However, to enable the camera body 3 to continuously perform photographing, it is preferable that the file format conversion processing including replacement of a left-eye image and a right-eye image is performed by the head mount display 4. This is also useful from a viewpoint of reduction of power consumption by the camera body 3.

Figure 11:
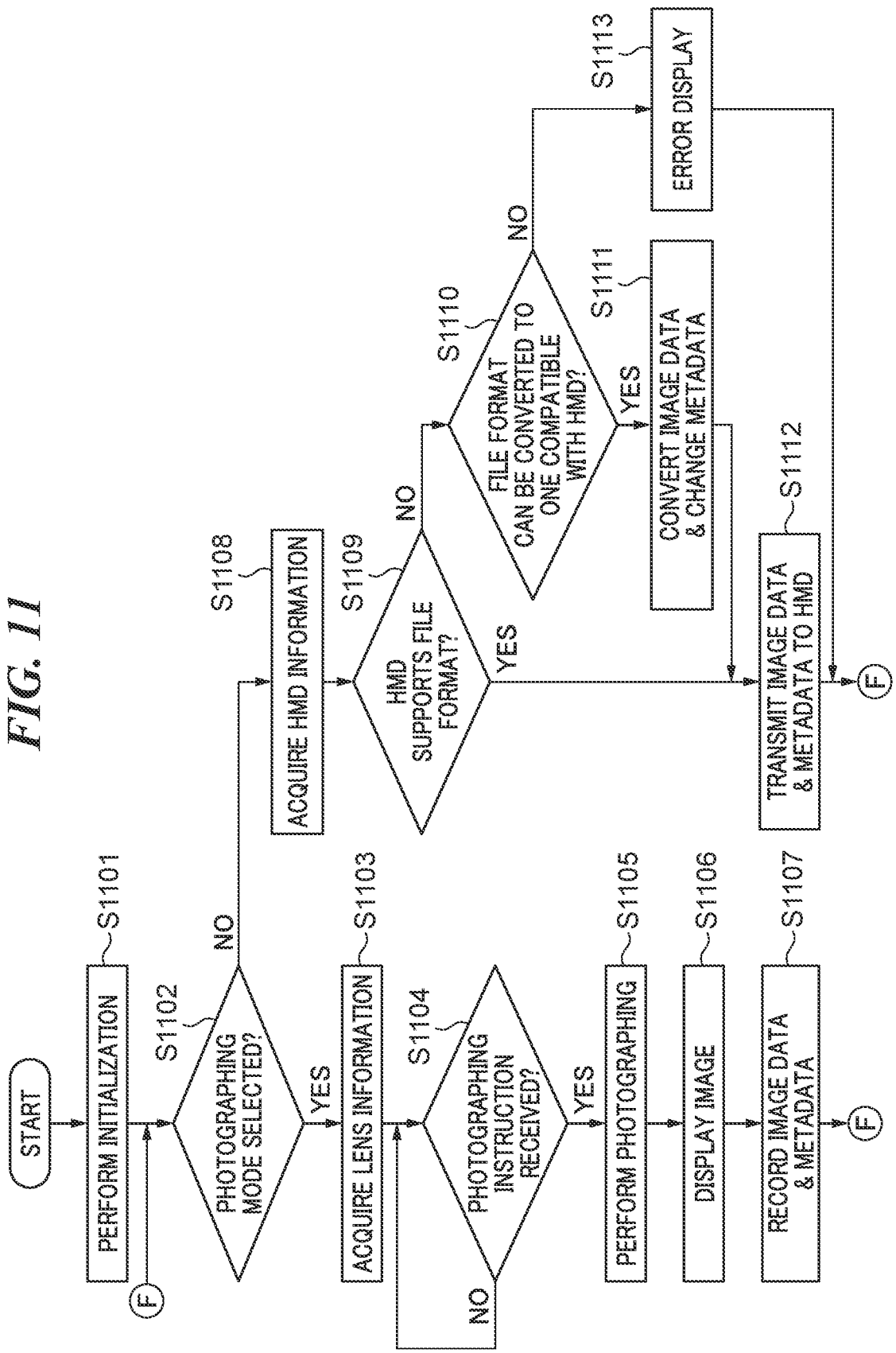
FIG. 11 is a flowchart of an example of a process performed by a camera body in a fourth embodiment.

FIG. 11 is a flowchart of an example of a process performed by the camera body 3 in the fourth embodiment. In a step S1101, the camera controller 201 performs initialization of the camera body 3. In a step S1102, the camera controller 201 determines whether or not a photographing mode has been selected. The camera body 3 has a plurality of modes, and the user can select a mode using the operation section 207. Here, it is assumed that the plurality of modes include the photographing mode for executing photographing and a transmission mode for transmitting image data to the head mount display 4. It the answer to the question of the step S1102 is affirmative (YES), the camera controller 201 proceeds to a step S1103. In the step S1103, the camera controller 201 communicates with the lens unit attached to the camera body 3 and acquires the lens information. The lens information includes information on the lens configuration, such as whether the lens is a lens unit with a single optical system, a lens unit with a double optical system, or a lens unit with a triple optical system. Further, the lens information may include information on the model number, the manufacturing time, the focal length, aberration, and so forth, of the lens. In the illustrated example in FIG. 2, the lens information indicating that the lens unit with a double optical system is attached is acquired.

In a step S1104, the camera controller 201 remains on standby until an instruction for photographing an image is received. When an instruction for photographing an image is received, the camera controller 201 performs photographing in the next step S1105. In a step S1106, the camera controller 201 displays a photographed image on the display section 204.

In a step S1107, the camera controller 201 records metadata associated with the type of the lens unit attached to the camera body 3 together with the image data. If the lens unit attached to the camera body 3 is a lens unit with a single optical system, information indicating that the image data has been photographed through the lens unit with a single optical system is recorded in the metadata. If a lens unit with a double optical system is attached to the camera body 3, the camera controller 201 records, in the metadata, information indicating that the image data includes the two images of a left-eye image and a right-eye image and the positions of the left-eye image and the right-eye image are reversed. If a lens unit with a triple optical system is attached to the camera body 3, the camera controller 201 records, in the metadata, information indicating that the image data includes the three images of a left-eye image, a center image, and a right-eye image, and the positions of the left-eye image and the right-eye image are reversed. At this time, the camera controller 201 may display a message, such as "The image for the left eye and the image for the right eye are reversed.", together with the image. This enables the user to be aware that the left-eye image and the right-eye image are in the reversed state. The camera controller 201 stores file information generated by adding the metadata to the photographed image (image data) in a memory card connected to the card connection section 210. Then, the camera controller 201 returns to the step S1102.

If the answer to the question of the step S1102 is negative (NO), i.e. the transmission mode for transmitting the image data to the head mount display 4 has been selected, the camera controller 201 proceeds to a step S1108. In the step S1108, the camera controller 201 requests the head mount display 4 to transmit the characteristic information indicative of the processing capability of the head mount display 4 and receives this characteristic information from the head mount display 4.

In a step S1109, the camera controller 201 determines based on the capability information of the head mount display 4 whether or not the head mount display 4 has a function of performing the stereoscopic display based on the image data generated by the camera body 3. This includes a case where the head mount display 4 has the function of converting the file format of image data generated by the camera body 3 to a file format which can be displayed by the head mount display 4.

If the answer to the question of the step S1109 is affirmative (YES), the camera controller 201 proceeds to a step S1112. In the step S1112, the camera controller 201 transmits the file information including the image data and the metadata, stored in the step S1107, to the head mount display 4. On the other hand, if the answer to the question of the step S1109 is negative (NO), the camera controller 201 proceeds to a step S1110.

In the step S1110, the camera controller 201 determines whether or not a file format which can be stereoscopically displayed by the head mount display 4 is included in the file formats which can be converted by the image processor 203. This determination can be made based on the characteristic information acquired in the step S1108. If the answer to the question of the step S1110 is affirmative (YES), the camera controller 201 proceeds to a step S1111 and controls the image processor 203 to convert the file format of the image data to the file format which can be stereoscopically displayed by the head mount display 4. Then, the process proceeds to the step S1112. If the answer to the question of the step S1110 is negative (NO), the process proceeds to a step S1113, wherein the camera 201 notifies the user that the photographed image data cannot be displayed by the head mount display 4, and returns to the step S1102. Here, the camera controller 201 may transmit a version-up request to an external application server via the wired communication section 205 or the wireless communication section 206. The external application server transmits data for version-up to the camera body 3, for upgrading the application to an application which is capable of converting the file format to the file format which can be displayed by the head mount display 4, indicated by the characteristic information, in response to the version-up request. The camera controller 201 executes upgrading of the version of the application in the image processor 203 using the received data.

As described above, in the present embodiment, the camera body 3 converts the file format of image data for a stereoscopic image according to the characteristics of the head mount display 4. By doing this, it is possible to cause the head mount display 4 to perform the stereoscopic display even if the head mount display 4 is not equipped with the file format conversion function.

Further, if the camera body 3 has acquired the characteristic information of the head mount display 4 in advance when photographing is performed, the camera body 3 may generate image data compatible with the characteristics of the head mount display 4 in parallel with the photographing operation. However, in a mode in which load of image processing is high, such as a moving image photographing mode, the processing for generating image data compatible with the characteristics of the head mount display 4 in parallel with the photographing operation may be inhibited. In this case, depending on the type and settings of photographing, there arises a case where image data compatible with the characteristics of the head mount display 4 can be generated in advance or a case whether the same cannot be generated in advance. For this reason, in a case where image data compatible with the characteristics of the head mount display 4 is not generated, this fact may be notified to a user.

Next, a fifth embodiment will be described. In the fifth embodiment, image data captured by the camera body 3 to which the lens unit with a double optical system is attached is transmitted to the personal computer 5. The head mount display 4 notifies the personal computer 5 of its own characteristic information, and the personal computer 5 convers the file format based on the capability information. Then, the personal computer 5 transmits the converted file to the head mount display 4.

Figure 12:
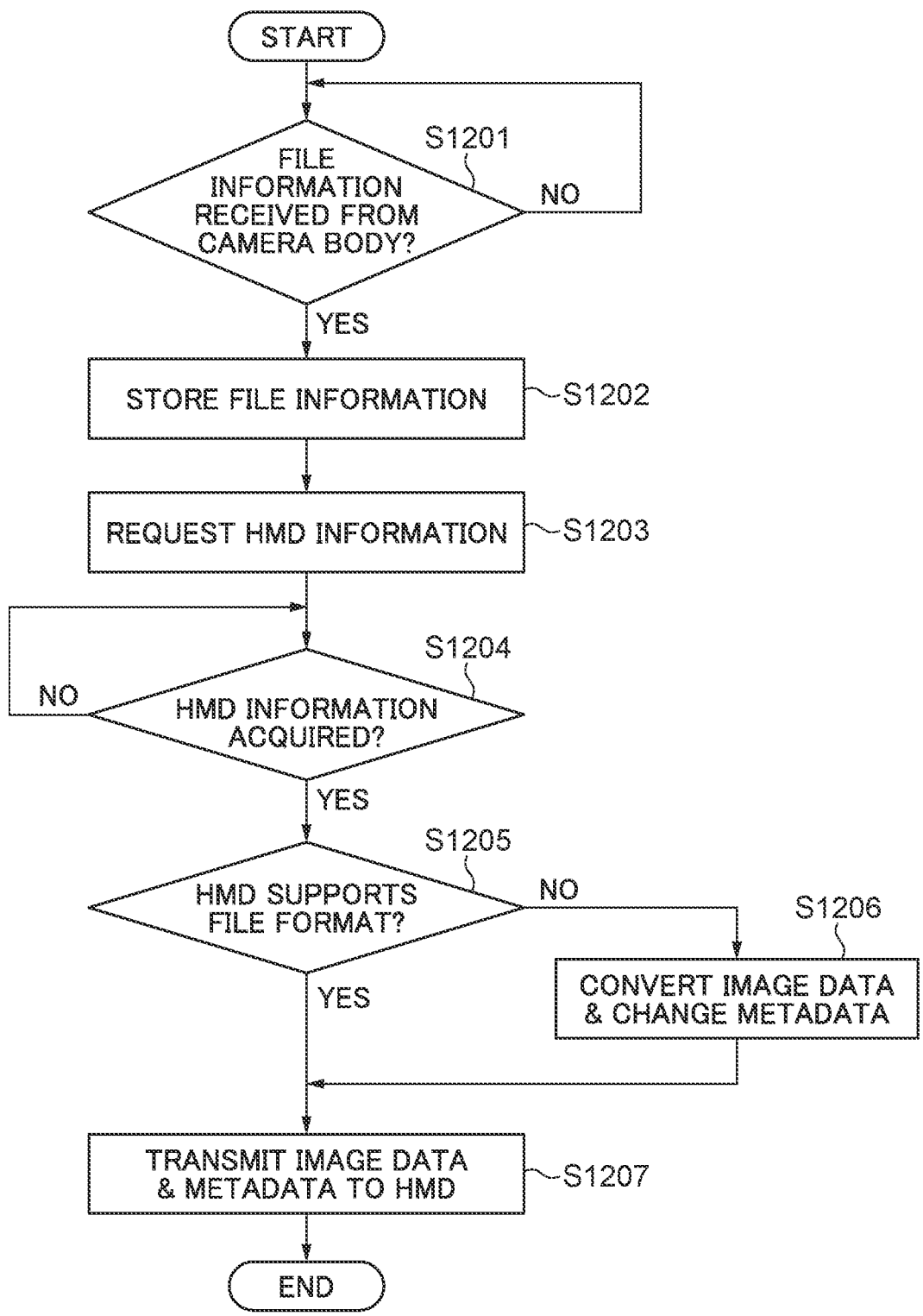
FIG. 12 is a flowchart of an example of a process performed by the personal computer in a fifth embodiment.

FIG. 12 is a flowchart of an example of a process performed by the personal computer 5 in the fifth embodiment.

In a step S1201 in FIG. 12, the CPU 501 remains on standby until file information is received from the camera body 3. For example, the camera controller 201 of the camera body 3 transmits file information to the personal computer 5 whenever photographing is performed. If the answer to the question of the step S1201 is affirmative (YES), in a step S1202, the CPU 501 stores the received file information in the data memory 503 or the storage section 506. The received file information includes photographed image data and metadata. The metadata includes information indicative of the file format of the image data.

In a step S1203, the CPU 501 requests the head mount display 4 to transmit the characteristic information of the head mount display 4. In a step S1204, the CPU 501 remains on standby until the characteristic information is received from the head mount display 4, and upon receipt of the characteristic information, the CPU 501 proceeds to a step S1205.

In the step S1205, the CPU 501 determines based on the received characteristic information whether or not the head mount display 4 is equipped with the function of displaying a stereoscopic image based on the image data received in the step S1201, i.e. whether or not the head mount display 4 is compatible with the file format of the image data received in the step S1201. If the answer to the question of the step S1205 is affirmative (YES), the CPU 501 proceeds to a step S1207, whereas if the answer is negative (NO), the CPU 501 proceeds to a step S1206.

In the step S1206, the CPU 501 converts the file format of the image data received in the step S1201 to the file format of image data which can be stereoscopically displayed by the head mount display 4, and further rewrites the metadata into metadata whose contents are associated with the converted image data.

In the step S1207, the file information including the image data whose file format has been converted and the rewritten metadata is transmitted to the head mount display 4.

As described above, according to the present embodiment, even when the usable file format is different between the camera body 3 and the head mount display 4, it is possible to display a stereoscopic image on the head mount display 4. Note that although in the present embodiment, the description is given of the case where the file information including image data and metadata is transmitted from the camera body 3 to the personal computer 5 by way of example, this is not limitative. In a case where the head mount display 4 cannot display a stereoscopic image using the file information received from the camera body 3, the file information including the image data and the metadata may be transmitted from the head mount display 4 to the personal computer 5. Upon receipt of the image data from the head mount display 4, the personal computer 5 converts the image data to image format whose file format is compatible with the head mount display 4 and corrects the metadata. After that, the personal computer 5 transmits the converted image data and the metadata attached thereto to the head mount display 4.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-152202, filed Sep. 10, 2020, which is hereby incorporated by reference herein in its entirety.

What is claimed is:

1. An image processing apparatus, comprising:
   at least one processor; and
   a memory coupled to the at least one processor, the memory having instructions that, when executed by the processor, perform the operations as:
   a reception unit configured to receive, from an image capturing apparatus on which a double optical system lens unit is mounted, image data including a first image area and a second image area, which are formed by being respectively obtained through an optical system for a right eye and an optical system for a left eye of the double optical system lens unit, and metadata associated with the image data;
   a display control unit configured to cause a display unit to display a stereoscopic image, using the image data;
   a first determination unit configured to determine whether or not to upgrade an application based on a file format of an image file indicated by the metadata;
   an upgrading unit configured to perform upgrading process for upgrading the application by obtaining predetermined data from an external apparatus in accordance with a result of the determination;
   a second determination unit configured to, after the upgrading process is performed on the application, analyze the image data and compare the first image area and the second image area, and thereby determining whether or not the first image area and the second image area are in a reversed state with respect to right and left in the image data; and
   an image processing unit configured to, in a case where the result of the determination indicates that the first image area and the second image area are in a reversed state with respect to right and left in the image data, perform a process for replacing the first image area and the second image area with each other, right and left, in the image data,
   wherein the display control unit displays, on the display unit, the stereoscopic image using image data which is subjected to the process for replacing the first image area and the second image area with each other, right and left, in the image data.

2. The image processing apparatus according to claim 1, wherein the control unit requests the external apparatus on a network to upgrade the version of the application.

3. The image processing apparatus according to claim 1, wherein the image data is in a file format of image data generated by forming images of an identical object in one sensor through the optical system for the right eye and the optical system for the left eye, respectively.

4. The image processing apparatus according to claim 1, further comprising the display unit.

5. An image processing method, comprising:
receiving, from an image capturing apparatus on which a double optical system lens unit is mounted, image data including a first image area and a second image area, which are formed by being respectively obtained through an optical system for a right eye and an optical system for a left eye of the double optical system lens unit, and metadata associated with the image data;
causing a display unit to display a stereoscopic image using the image data;
determining whether or not to upgrade an application based on a file format of an image file indicated by the metadata;
performing an upgrading process for upgrading the application by obtaining predetermined data from an external apparatus in accordance with a result of the determination;
analyzing, after the upgrading process is performed on the application, the image data, comparing the first image area and the second image area, and thereby determining whether or not the first image area and the second image area are in a reversed state with respect to right and left in the image data; and
performing, in a case where the result of the determination indicates that the first image area and the second image area are in a reversed state with respect to right and left in the image data, a process for replacing the first image area and the second image area with each other, right and left, in the image data,
wherein the stereoscopic image is displayed on the display unit using image data which is subjected to the process for replacing the first image area and the second image area with each other, right and left, in the image data.

6. A non-transitory computer-readable storage medium storing a program for causing a computer to execute an image processing method,
wherein the image processing method comprises:
receiving, from an image capturing apparatus on which a double optical system lens unit is mounted, image data including a first image area and a second image area, which are formed by being respectively obtained through an optical system for a right eye and an optical system for a left eye of the double optical system lens unit, and metadata associated with the image data;
causing a display unit to display a stereoscopic image using the image data;
determining whether or not to upgrade an application based on a file format of an image file indicated by the metadata;
performing an upgrading process for upgrading the application by obtaining predetermined data from an external apparatus in accordance with a result of the determination;
analyzing, after the upgrading process is performed on the application, the image data, comparing the first image area and the second image area, and thereby determining whether or not the first image area and the second image area are in a reversed state with respect to right and left in the image data; and
performing, in a case where the result of the determination indicates that the first image area and the second image area are in a reversed state with respect to right and left in the image data, a process for replacing the first image area and the second image area with each other, right and left, in the image data,
wherein the stereoscopic image is displayed on the display unit using image data which is subjected to the process for replacing the first image area and the second image area with each other, right and left, in the image data.

7. The image processing apparatus according to claim 1, wherein the second determination unit determines that the first image area and the second image area are in a reversed state with respect to right and left in the image data, in a case where a position of a specific object image in a left image area, out of the first image area and the second image area, shifts in a left direction with respect to a back ground compared with a position of the specific object image in a right image area, out of the first image area and the second image area.

8. The image processing apparatus according to claim 7, wherein the specific object image is an image of an object as a target of AF.

* * * * *